US012334008B2

(12) United States Patent
Choi et al.

(10) Patent No.: US 12,334,008 B2
(45) Date of Patent: Jun. 17, 2025

(54) DISPLAY DEVICE

(71) Applicant: LG Display Co., Ltd., Seoul (KR)

(72) Inventors: Youngjun Choi, Incheon (KR); HyeMi Oh, Seoul (KR); SoJung Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/978,687

(22) Filed: Nov. 1, 2022

(65) Prior Publication Data

US 2023/0178019 A1 Jun. 8, 2023

(30) Foreign Application Priority Data

Dec. 2, 2021 (KR) ........................ 10-2021-0171145

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/0262* (2013.01); *G09G 2310/08* (2013.01); *G09G 2320/0252* (2013.01); *G09G 2320/043* (2013.01)

(58) Field of Classification Search
None
See application file for complete search history.

(56) References Cited

U.S. PATENT DOCUMENTS 9,786,222 B2 10/2017 Lim et al.
9,818,345 B2 11/2017 Shim et al.
10,916,197 B1 * 2/2021 Zhang .................. G09G 3/3258
11,270,639 B2 3/2022 Yamamoto
2012/0169798 A1 * 7/2012 Ebisuno ................ G09G 3/325 345/77
2015/0084946 A1 * 3/2015 Shim .................... G09G 3/3291 345/212
2016/0042694 A1 * 2/2016 Lim ..................... G09G 3/3233 345/78
2016/0329392 A1 * 11/2016 Miyake ................ G09G 3/3233
(Continued)

FOREIGN PATENT DOCUMENTS

JP 2021-067900 A 4/2021
KR 10-2015-0034069 A 4/2015
KR 10-2016-0018892 A 2/2016

OTHER PUBLICATIONS

Korean Intellectual Property Office, Office Action, Korean Patent Application No. 10-2021-0171145, Nov. 20, 2024, 21 pages.

*Primary Examiner* — Benjamin X Casarez
(74) *Attorney, Agent, or Firm* — Fenwick & West LLP

(57) ABSTRACT

A display device, a turn-on state, and a turn-off state of a driving transistor can be easily controlled by a control of a control voltage applied to a control gate electrode opposed to a driving gate electrode of the driving transistor and a non-light-emitting driving can be performed in a display driving. Furthermore, as the non-light-emitting driving is performed by the control voltage applied to the control gate electrode of the driving transistor, the non-light-emitting driving can be performed independently from a period in which a scan signal is applied, the non-light-emitting driving can be performed without affecting a display driving and a video response time of the display device can be improved.

20 Claims, 17 Drawing Sheets

(56) References Cited

U.S. PATENT DOCUMENTS

| | | | | |
|---|---|---|---|---|
| 2017/0352313 | A1* | 12/2017 | Miyake | G09G 3/3258 |
| 2019/0362674 | A1* | 11/2019 | Xu | G09G 3/3241 |
| 2020/0234641 | A1* | 7/2020 | Jeong | G09G 3/3233 |
| 2021/0027714 | A1* | 1/2021 | Shi | G09G 3/3233 |
| 2021/0125556 | A1* | 4/2021 | Yamamoto | G09G 3/3233 |
| 2021/0335242 | A1* | 10/2021 | Kim | G09G 3/3233 |

* cited by examiner

DISPLAY DEVICE

CROSS REFERENCE TO RELATED APPLICATION

This application claims priority from Republic of Korea Patent Application No. 10-2021-0171145, filed on Dec. 2, 2021, which is hereby incorporated by reference in its entirety.

BACKGROUND

Field

Embodiments of the present disclosure are related to a display device.

Description of Related Art

The growth of the information society leads to increased demand for display devices to display images and use of various types of display devices, such as liquid crystal display devices, organic light emitting display devices, etc.

As the organic light emitting display devices display an image by using an organic light-emitting diode which emits a light by itself, thereby advantages are provided that a response speed is fast and a light-emitting efficiency, and a luminance and a viewing angle is great.

Furthermore, methods being capable of reducing a video image response time of the organic light-emitting display devices are researched and developed.

SUMMARY

Embodiments of the present disclosure can provide a display device being capable of improving a video response time while reducing a change of a structure and a driving method of a subpixel disposed in the display device.

Embodiments of the present disclosure can provide a display device including a display panel in which a plurality of gate lines, a plurality of data lines and a plurality of subpixels are disposed, a plurality of light-emitting elements disposed on each of the plurality of subpixels, and a plurality of driving transistors configured to drive each of the plurality of light-emitting elements and including a driving gate electrode and a control gate electrode which is opposed to the driving gate electrode and electrically connected to a control voltage line, and wherein, in a control period which is a part of a frame period, a control voltage of a first level is applied to the control gate electrode of at least one driving transistor of the plurality of driving transistors, and the at least one driving transistor is turned-off in the control period.

Embodiments of the present disclosure can provide a display device including a display panel in which a plurality of gate lines, a plurality of data lines and a plurality of subpixels are disposed, and a plurality of driving transistors disposed on each of the plurality of subpixels and including a driving gate electrode and a control gate electrode which is opposed to the driving gate electrode and electrically connected to a control voltage line, and wherein a level of a control voltage applied to the control gate electrode of at least one driving transistor of the plurality of driving transistors in a period that a scan signal is applied to a first gate line of the plurality of gate lines is different from a level of the control voltage applied to the control gate electrode of the at least one driving transistor in a period that a scan signal is applied to a second gate line of the plurality of gate lines.

According to various embodiments of the present disclosure, as a driving transistor disposed on a subpixel is turned-off by a control of a control voltage applied to a control gate electrode of the driving transistor in a frame period, thus a structure and a driving method of a subpixel being capable of improving a video response time of a display device can be easily implemented.

According to various embodiments of the present disclosure, a turn-on state, a turn-off state of a driving transistor can be easily controlled by a control of a control voltage applied to a control gate electrode opposed to a driving gate electrode of the driving transistor and a non-light-emitting driving can be performed in a display driving. Furthermore, as the non-light-emitting driving is performed by the control voltage applied to the control gate electrode of the driving transistor, the non-light-emitting driving can be performed independently from a period in which a scan signal is applied, the non-light-emitting driving can be performed without affecting a display driving and a video response time of the display device can be improved.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
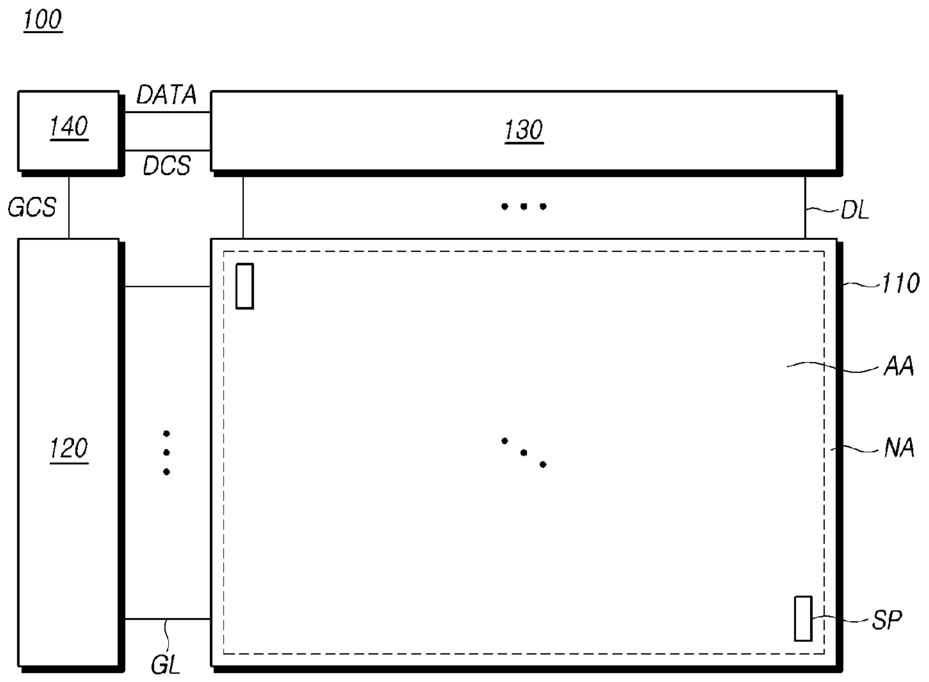
FIG. 1 is a diagram schematically illustrating a configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Hereinafter, various embodiments of the present disclosure will be described in detail with reference to accompanying drawings.

FIG. 1 is a diagram schematically illustrating a configuration of a display device 100 according to embodiments of the present disclosure.

Referring to FIG. 1, the display device 100 can include a display panel 110, a gate driving circuit 120, a data driving circuit 130, and a controller 140 for driving the display panel 110.

The display panel 110 can include an active area AA where a plurality of subpixels SP are disposed, and a non-active area NA which is located outside the active area AA.

A plurality of gate lines GL and a plurality of data lines DL can be arranged on the display panel 110. The plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC, and can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Alternatively, each gate driver integrated circuit GDIC can be implemented by a gate-in-panel GIP method to then be directly arranged on the display panel 110. Alternatively, the gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data DATA from the controller 140 and converts the image data DATA into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data DATA.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Alternatively, each source driver integrated circuit SDIC can be directly disposed on the display panel 110. Alternatively, the source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 can supply various control signals to the gate driving circuit 120 and the data driving circuit 130, and control the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system) of the display device 100, various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

Each subpixel SP is an area defined by a crossing of a gate line GL and a data line DL, and at least one circuit element including an element emitting a light can be disposed in the subpixel SP.

For example, in a case that the display device 100 is an organic light-emitting display device, an organic light-emitting diode OLED and various circuit elements can be disposed on the plurality of subpixels SP. As controlling a current supplied to the organic light-emitting diode OLED by the various circuit elements, each subpixel SP can represent a luminance corresponding to an image data.

Alternatively, in some cases, a light-emitting diode LED, or a micro light-emitting diode μLED can be disposed on the subpixel SP.

Figure 2:
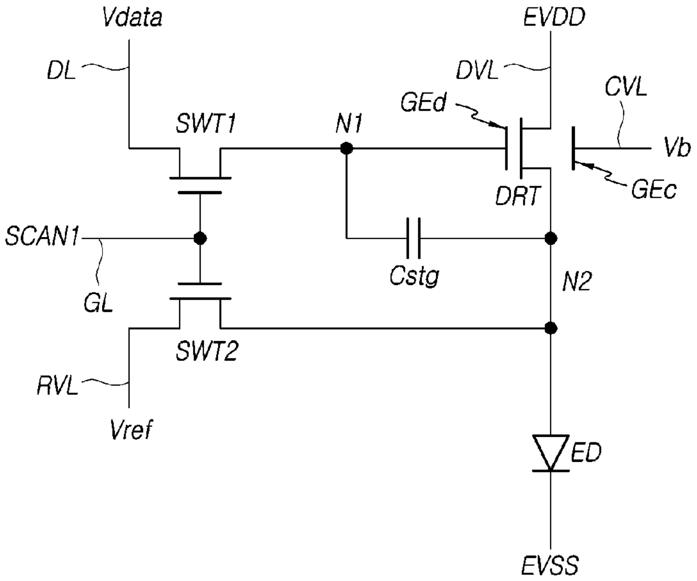
FIG. 2 is a diagram illustrating an example of a circuit structure of a subpixel included in a display device according to embodiments of the present disclosure.

FIG. 2 is a diagram illustrating an example of a circuit structure of the subpixel SP included in the display device 100 according to embodiments of the present disclosure.

Referring to FIG. 2, each of the plurality of subpixels SP can include a light-emitting element ED. The subpixel SP can include a driving transistor DRT configured to supply a driving current to the light-emitting element ED.

The subpixel SP can include at least one circuit element other than the light-emitting element ED and the driving transistor DRT for a driving of the subpixel SP.

For example, the subpixel SP can include a first switching transistor SWT1, a second switching transistor SWT2, and a storage capacitor Cstg.

An example of a circuit structure of the subpixel SP illustrated in FIG. 2 illustrates 3T1C structure that three thin film transistors and one capacitor are included in the subpixel SP, but embodiments of the present disclosure are not limited to this, and at least one driving transistor may be disposed on the subpixel SP. Furthermore, an example that all of the thin film transistors disposed on the subpixel SP illustrated in FIG. 2 are an N type is illustrated, but at least some of the thin film transistors included in the subpixel SP can be a P type.

The first switching transistor SWT1 can be electrically connected between the data line DL and a first node N1.

The first switching transistor SWT1 can be controlled by the gate line GL to which a first scan signal SCAN1 is applied.

The first switching transistor SWT1 can control that the data voltage Vdata supplied through the data line DL is applied to the first node N1. The first node N1 can be a gate node of the driving transistor DRT.

The second switching transistor SWT2 can be electrically connected between a reference voltage line RVL and a second node N2.

The second switching transistor SWT2 can be controlled by the gate line GL to which the first scan signal SCAN1 is applied.

The second switching transistor SWT2 can be controlled by a gate line GL different from the gate line GL controlling the first switching transistor SWT1, but such as an example illustrated in FIG. 2, can be controlled by a gate line GL same as the gate line GL controlling the first switching transistor SWT1. The gate line GL disposed on the active area AA can be reduced.

The second switching transistor SWT2 can control that a reference voltage Vref is applied to the second node N2. The second node N2 can be a source node or a drain node of the driving transistor DRT.

The second switching transistor SWT2 can be driven in a process that a voltage or a current of the second node N2 is sensed through the reference voltage line RVL.

A degeneration of the driving transistor DRT or the light-emitting element ED disposed on the subpixel SP can be detected by a sensing through the reference voltage line RVL. As a compensation based on the degeneration detected through the sensing is performed, an image quality drop due to a deviation of the degeneration of the subpixel SP can be prevented.

The storage capacitor Cstg can be electrically connected between the first node N1 and the second node N2. The storage capacitor Cstg can maintain a voltage difference between the first node N1 and the second node N2 during one frame.

The driving transistor DRT can be electrically connected to a driving voltage line DVL in which a first driving voltage EVDD is supplied. The first driving voltage EVDD, for example, can be a high potential driving voltage.

The driving transistor DRT can be controlled by the data voltage Vdata applied to the first node N1. The driving transistor DRT can output a driving current according to a voltage difference of the first node N1 and the second node N2, and control a driving of the light-emitting element ED.

The light-emitting element ED can be electrically connected to the second node N2. The light-emitting element ED can be electrically connected to a voltage line in which a second driving voltage EVSS is applied. The second driving voltage EVSS, for example, can be a low potential driving voltage.

The light-emitting element ED can emit a light according to the driving current supplied by the driving transistor DRT and represent an image according to a grayscale.

The light-emitting element ED may not emit a light in a part period of a period that the light-emitting element ED is emitting a light for improving a video response time.

For example, as the data voltage Vdata corresponding to a black image is supplied through the data line DL, the driving transistor DRT can be turned-off and the light-emitting element ED may not emit a light. In this case, a driving of the gate line GL and the data line DL for a supply of the data voltage Vdata to the subpixel SP can be required.

Embodiments of the present disclosure can provide methods being capable of making the light-emitting element ED not to emit a light without affecting a driving of the gate line GL and the data line DL through a driving of a different gate electrode from a gate electrode, of the gate electrodes of the driving transistor DRT, to which the data voltage Vdata is applied.

Below, a driving method controlling the light-emitting element ED not to emit a light in a driving of the subpixel SP for an improvement of a video response time can be referred to "a non-light-emitting driving". Furthermore, the non-light-emitting driving can mean a driving that the driving transistor DRT and the light-emitting element ED are a turn-off state, but in some cases, can include a state that the light-emitting element ED emits a light of a very low grayscale.

For example, the driving transistor DRT disposed on the subpixel SP can include a driving gate electrode GEd and a control gate electrode GEc. A first control gate electrode of a first driving transistor disposed on a first subpixel of the plurality of subpixels SP may be electrically connected to a second control gate electrode of a second driving transistor disposed on a second subpixel of the plurality of subpixels SP.

In one embodiment, the driving gate electrode GEd of the driving transistor DRT is the first node N1 or an electrode electrically connected to the first node N1. The driving gate electrode GEd of the driving transistor DRT can control a driving of the driving transistor DRT according to the data voltage Vdata applied to the first node N1.

The control gate electrode GEc of the driving transistor DRT can be disposed to be opposed to the driving gate electrode GEd.

For example, the control gate electrode GEc and the driving gate electrode GEd of the driving transistor DRT can be positioned on both sides with respect to a channel.

The control gate electrode GEc of the driving transistor DRT can be implemented by using a light-shielding layer disposed for preventing that an external light enters to the channel of the driving transistor DRT. Alternatively, the control gate electrode GEc of the driving transistor DRT can be implemented by using an electrode layer disposed separately.

The control gate electrode GEc of the driving transistor DRT can be implemented by using any one electrode layer positioned to be opposed to the driving gate electrode GEd to which the data voltage Vdata is applied.

The control gate electrode GEc of the driving transistor DRT can be electrically connected to a control voltage line CVL to which a control voltage Vb is supplied.

A threshold voltage of the driving transistor DRT can be changed according to the control voltage Vb applied to the control gate electrode GEc of the driving transistor DRT.

Figure 3:
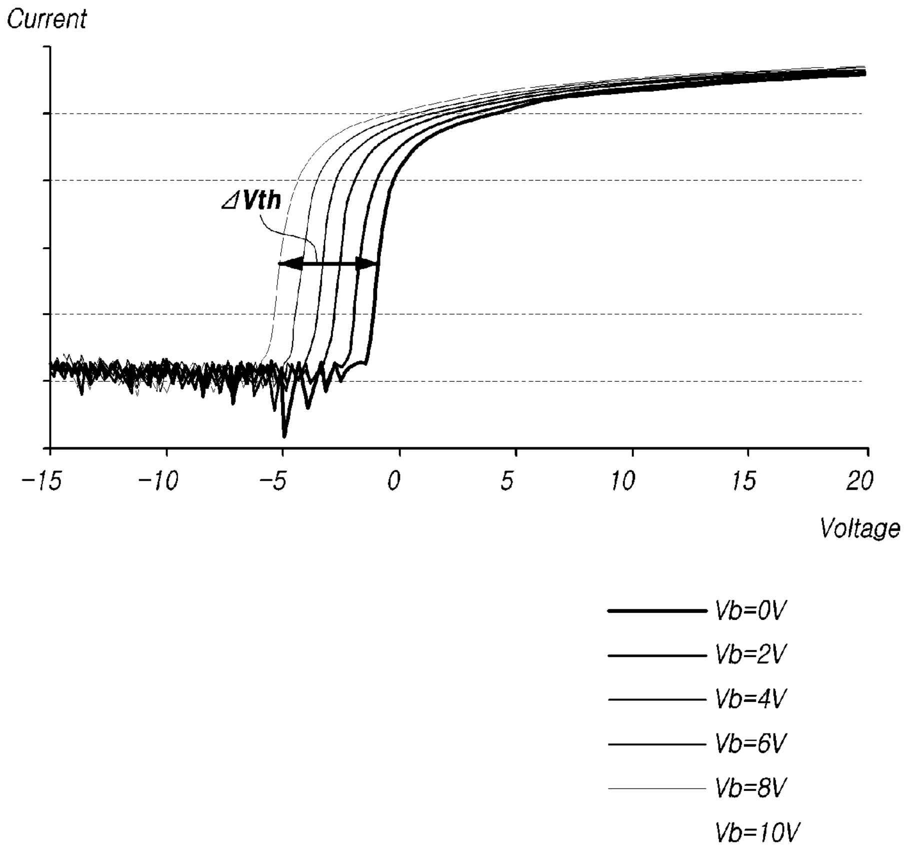
FIG. 3 is a diagram illustrating an example of a change of a threshold voltage of a driving transistor according to a control voltage applied to a control gate electrode of the driving transistor disposed on a subpixel illustrated in FIG. 2 according to embodiments of the present disclosure.

FIG. 3 is a diagram illustrating an example of a change of a threshold voltage of the driving transistor DRT according to the control voltage Vb applied to the control gate electrode GEc of the driving transistor DRT disposed on the subpixel SP illustrated in FIG. 2 according to one embodiment.

Referring to FIG. 3, it illustrates an example of a current to be output according to a voltage applied to the driving transistor DRT.

For example, if the control voltage Vb applied to the control gate electrode GEc of the driving transistor DRT decreases from 10V to 0V, the threshold voltage of the driving transistor DRT can increase as ΔVth.

As the threshold voltage Vth of the driving transistor DRT increases, a current to be output in a state that a same voltage is applied to the driving transistor DRT can be reduced.

A driving state of the light-emitting element ED can be changed by a reduction of a current to be output by the driving transistor DRT.

Furthermore, according to that the threshold voltage of the driving transistor DRT is changed, a turn-on state, a turn-off state of the driving transistor DRT can be changed.

According to that the turn-on state, turn-off state of the driving transistor DRT is changed, the driving transistor DRT can be turned-off and the light-emitting element ED can be a non-light-emitting state. As the light-emitting element ED has the non-light-emitting state in a period emitting a light, a non-light-emitting driving of the subpixel SP can be performed and a video response time can be improved.

As above-mentioned non-light-emitting driving is performed by a control of the control voltage Vb applied to the control gate electrode GEc of the driving transistor DRT, thus it can be performed without affecting a voltage applied to the first node N1 and the second node N2 of the driving transistor DRT.

The non-light-emitting driving for improving a video response time can be performed while reducing an influence affecting a display driving of the subpixel SP.

Figure 4A:
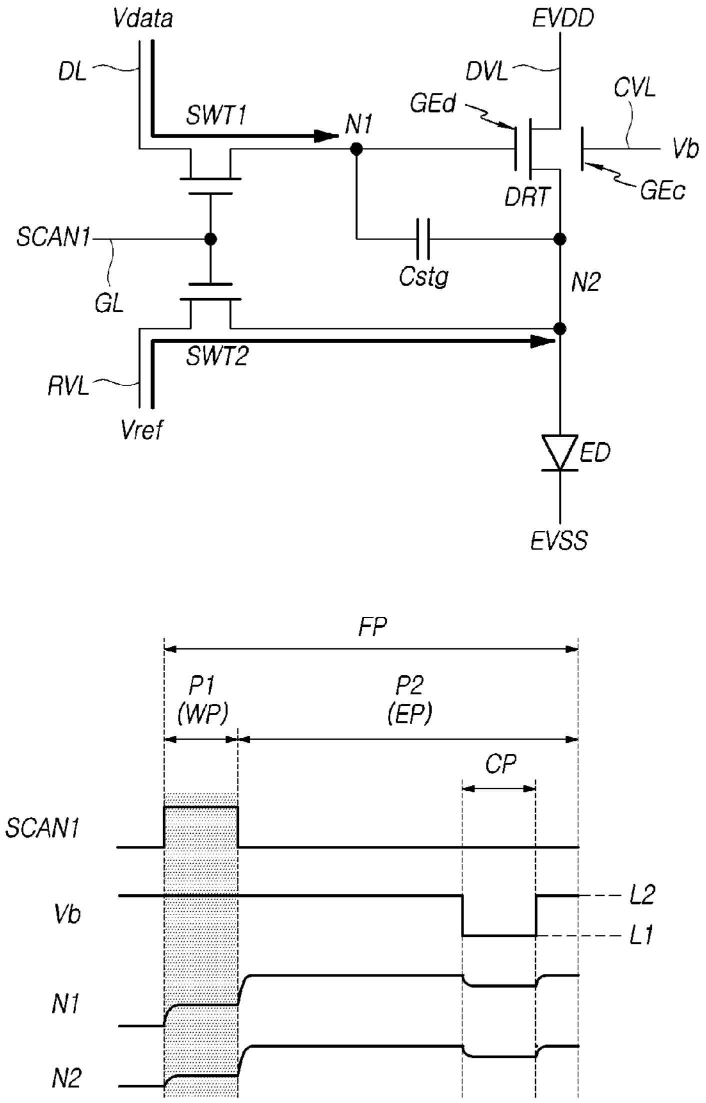
FIGS. 4A to 4C are diagrams illustrating examples of a driving method of a subpixel illustrated in FIG. 2 according to embodiments of the present disclosure.
Figure 4B:
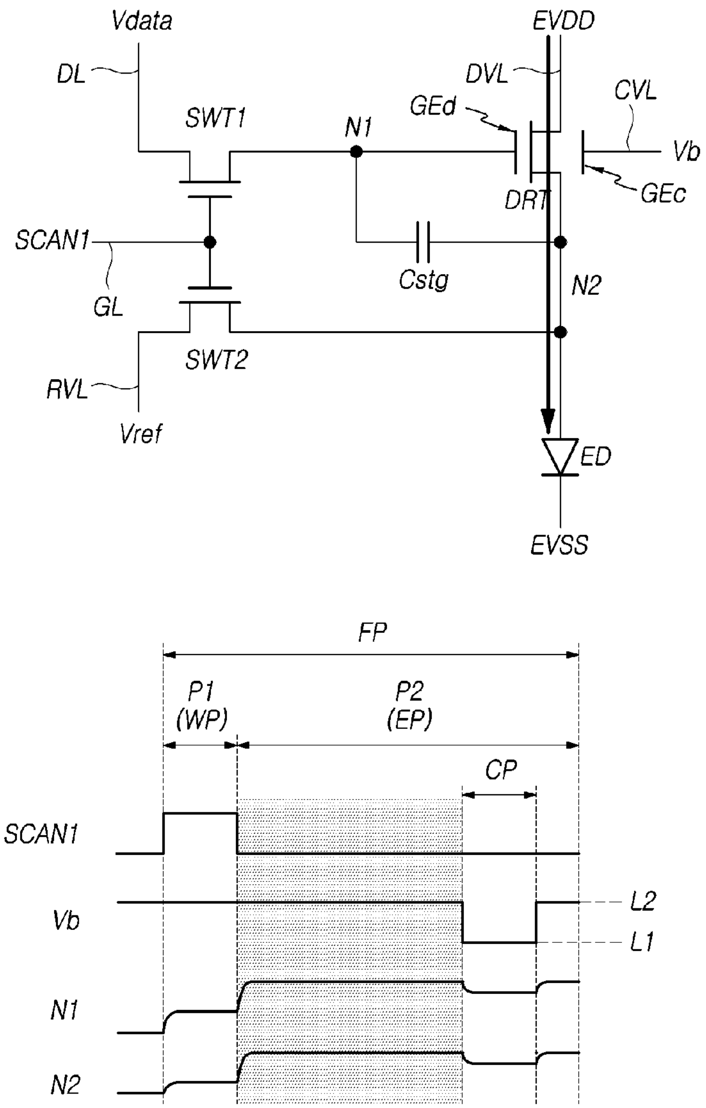
Figure 4C:
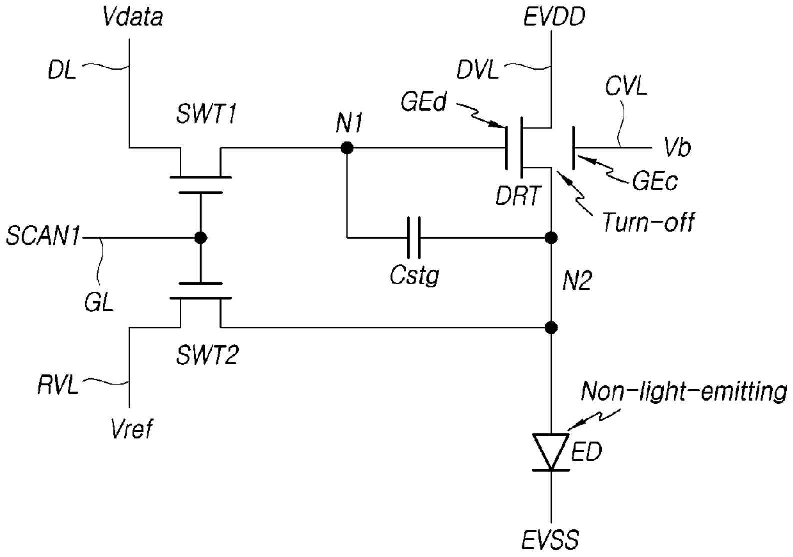
Figure 4C:
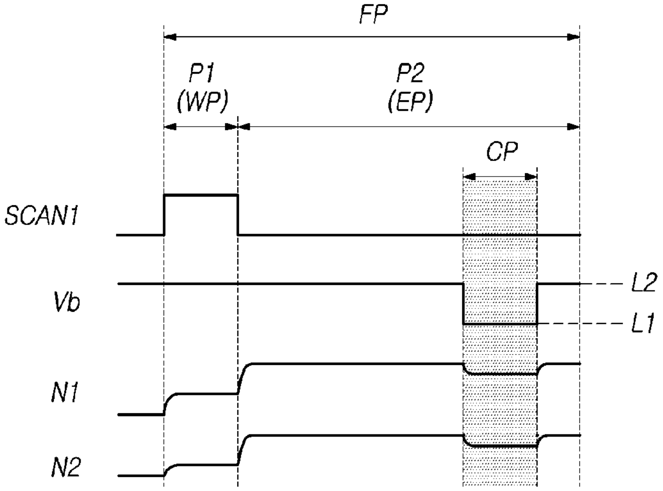

FIGS. 4A to 4C are diagrams illustrating examples of a driving method of the subpixel SP illustrated in FIG. 2 according to one embodiment.

Referring to FIG. 4A, the first scan signal SCAN1 of a high level can be applied to the gate line GL in a first period P1 of a frame period FP.

The first switching transistor SWT1 and the second switching transistor SWT2 can be turned-on by the first scan signal SCAN1.

As the first switching transistor SWT1 is turned-on, the data voltage Vdata supplied through the data line DL can be applied to the first node N1. As the second switching transistor SWT2 is turned-on, the reference voltage Vref supplied through the reference voltage line RVL can be applied to the second node N2.

A voltage for a display driving of the subpixel SP can be applied to the first node N1 and the second node N2 of the driving transistor DRT in the first period P1. The first period P1 can be referred to a data writing period WP.

Referring to FIG. 4B, the first scan signal SCAN1 of a low level can be applied to the gate line GL in a second period P2 of the frame period FP.

The first switching transistor SWT1 and the second switching transistor SWT2 can be turned-off by the first scan signal SCAN1.

As the first node N1 and the second node N2 are floated, a voltage level of the first node N1 and a voltage level of the second node N2 can increase. A driving current by the driving transistor DRT can be supplied, and the light-emitting element ED can emit a light representing a luminance corresponding to the data voltage Vdata.

The second period P2 can be referred to a light-emitting period EP.

The non-light-emitting driving can be performed during the light-emitting period EP.

For example, referring to FIG. 4C, a control period CP can be included in the frame period FP. At least a part of the control period CP may overlap the light-emitting period EP of the frame period EP. The control period CP can be a part of the frame period FP. FIG. 4C illustrates an example that the control period CP is a part of the light-emitting period EP, but in some cases, the control period CP can overlap the data writing period WP.

The control voltage Vb of a first level L1 can be applied to the control gate electrode GEc of the driving transistor DRT in the control period CP.

The control voltage Vb of the first level L1, for example, can be a voltage of a level being capable of shifting the threshold voltage of the driving transistor DRT to a positive direction. In some cases, in the case that the driving transistor DRT is a P type, it can be a voltage of a level being capable of shifting the threshold voltage of the driving transistor DRT to a negative direction.

The control voltage Vb of the first level L1 can be a voltage of a level being capable of turning-off the driving transistor DRT by changing the threshold voltage of the driving transistor DRT.

The driving transistor DRT can be turned-off by the control voltage Vb of the first level L1. As the driving transistor DRT is turned-off, the light-emitting element ED can be in a non-light-emitting state.

The non-light-emitting driving can be performed easily in the frame period FP by the control voltage Vb of the first level L1 applied to the control gate electrode GEc of the driving transistor DRT.

A level of the control voltage Vb applied to the control gate electrode GEc of the driving transistor DRT in a period other than the control period CP of the frame period FP can be a second level L2 different from the first level L1.

The control voltage Vb of the second level L2 can be a voltage of a level to drive the driving transistor DRT normally without shifting the threshold voltage of the driving transistor DRT to the positive direction.

As a level of the control voltage Vb decreases from the second level L2 to the first level L1 at a start timing of the control period CP, voltages of the first node N1 and the second node N2 can be coupled with the control gate electrode GEc and decrease a little. As a level of the control voltage Vb increases from the first level L1 to the second level L2 at an end timing of the control period CP, voltages of the first node N1 and the second node N2 can increase a little. That is, a voltage level of the driving gate electrode may be changed at a timing that the control voltage Vb of the first level L1 is applied.

A difference between a voltage level of the first node N1 and a voltage level of the second node N2 in the control period CP can be maintained same or similar with before the control period CP.

The control voltage Vb of the second level L2 can be applied to the control gate electrode GEc of the driving transistor DRT in a period other than the control period CP. A current output characteristic of the driving transistor DRT can be maintained stably by the control voltage Vb of the second level L2.

Furthermore, as a level of the control voltage Vb applied to the control gate electrode GEc of the driving transistor DRT is changed from the second level L2 to the first level L1 in the control period CP, the non-light-emitting driving of the subpixel SP can be performed easily.

Such as described above, according to embodiments of the present disclosure, the non-light-emitting driving of the subpixel SP can be performed easily without affecting a voltage supply for a display driving of the subpixel SP by a control of the control voltage Vb applied to the control gate electrode GEc of the driving transistor DRT.

Furthermore, as the control voltage Vb of a certain level is applied to the control gate electrode GEc of the driving transistor DRT in a period that the non-light-emitting driving is not performed, a stability of the current output characteristic of the driving transistor DRT can be improved.

Furthermore, the non-light-emitting driving of the subpixel SP can be performed in a structure that the stability of the current output characteristic of the driving transistor DRT is more improved.

Figure 5:
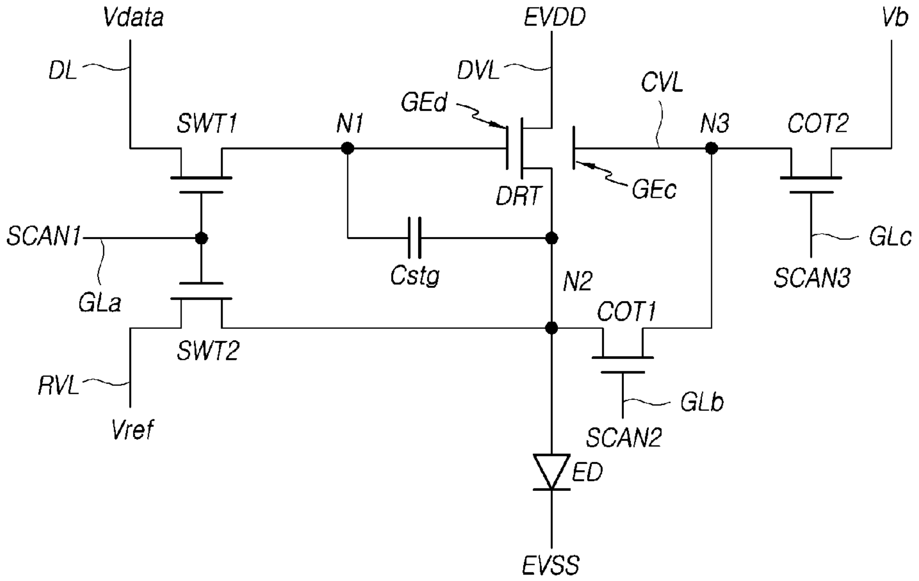
FIG. 5 is a diagram illustrating another example of a circuit structure of a subpixel included in a display device according to embodiments of the present disclosure.
Figure 6:
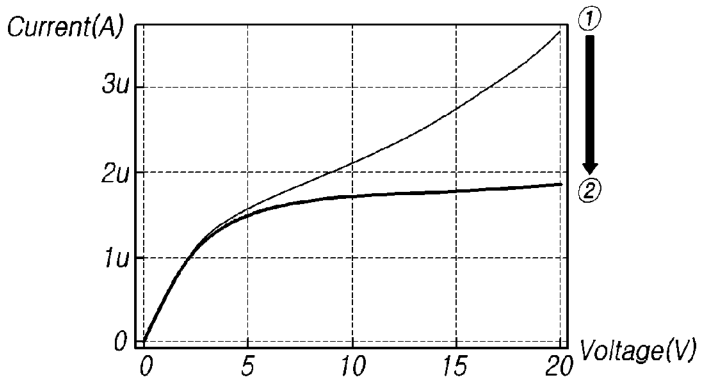
FIG. 6 is a diagram illustrating an example of an output curve of a driving transistor according to a driving of a first control transistor disposed on a subpixel illustrated in FIG. 5.
Figure 7:
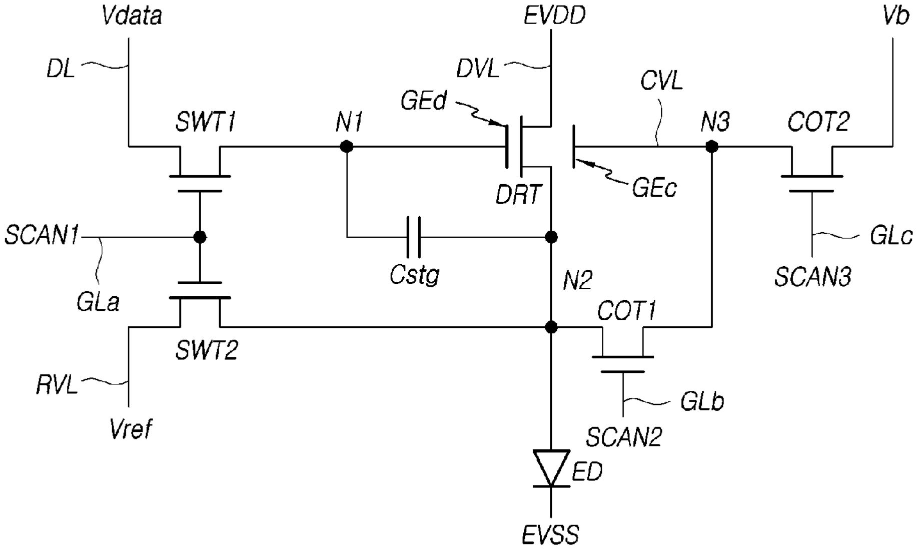
FIG. 7 is a diagram illustrating an example of a driving method of a subpixel illustrated in FIG. 5 according to embodiments of the present disclosure.
Figure 7:
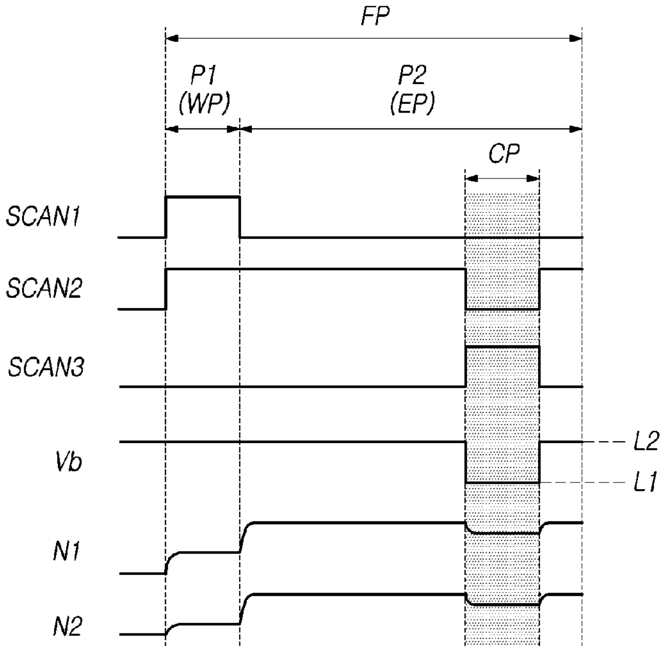

FIG. 5 is a diagram illustrating another example of a circuit structure of the subpixel SP included in the display device 100 according to embodiments of the present disclosure. FIG. 6 is a diagram illustrating an example of an output curve of the driving transistor DRT according to a driving of the first control transistor COT1 disposed on the subpixel SP illustrated in FIG. 5 according to one embodiment. FIG. 7 is a diagram illustrating an example of a driving method of the subpixel illustrated in FIG. 5 according to one embodiment.

Referring to FIG. 5, the subpixel SP can include the driving transistor DRT and the light-emitting element ED. The subpixel SP can include the first switching transistor SWT1, the second switching transistor SWT2 and the storage capacitor Cstg. Configurations above-mentioned are same with components described through FIG. 2, a repeated description will be omitted.

The subpixel SP can include a first control transistor COT1 electrically connected between the second node N2 and the third node N3. The first control transistor COT1 may be disposed on each of the plurality of subpixels SP.

The second node N2 can be the source node (or the drain node) of the driving transistor DRT. The third node N3 can be a node connected to the control gate electrode GEc of the driving transistor DRT.

The first control transistor COT1 can be controlled by the gate line GLb to which a second scan signal SCAN2 is applied. The gate line GLb to which the second scan signal SCAN2 is applied can be different from the gate line GLa to which the first scan signal SCAN1 is applied.

The subpixel SP can include a second control transistor COT2 electrically connected to the third node N3. In some cases, the second control transistor COT2 can be positioned outside of an area where the subpixel SP is disposed.

The second control transistor COT2 can be controlled by the gate line GLc to which a third scan signal SCAN3 is applied. The gate line GLc to which the third scan signal SCAN3 is applied can be different from the gate line GLa to which the first scan signal SCAN1 is applied or the gate line GLb to which the second scan signal SCAN2 is applied.

The second control transistor COT2 can be electrically connected to the control voltage line CVL. The second control transistor COT2 can control that the control voltage Vb is applied to the control gate electrode GEc of the driving transistor DRT.

In the case that the second control transistor COT2 is positioned outside of an area where the subpixel SP is disposed, the second control transistor COT2 can be electrically connected to one or a plurality of control voltage lines CVL, and control a supply of the control voltage Vb to the control gate electrode GEc of the driving transistor DRT.

As the first control transistor COT1 is electrically connected between the second node N2 and the third node N3, the second node N2 and the third node N3 can be electrically connected according to a driving of the first control transistor COT1. The source electrode and the control gate electrode GEc of the driving transistor DRT can be electrically connected to each other.

FIG. 6 illustrates an example of a curve of a current to be output according to a voltage applied to the driving transistor DRT according to one embodiment.

Referring to FIGS. 5 and 6, as the source electrode and the control gate electrode GEc of the driving transistor DRT are electrically connected to each other according to a driving of the first control transistor COT1, an output curve of the driving transistor DRT can be changed from ① to ②. A current output characteristic of the driving transistor DRT can be stable.

The current output characteristic of the driving transistor DRT can be stabilized by the first control transistor COT1 and the second control transistor COT2, and the non-light-emitting driving can be performed in the frame period FP.

Referring to FIG. 7, the first scan signal SCAN1 of a high level can be applied to the gate line GLa in the first period P1 of the frame period FP. Each of the data voltage Vdata and the reference voltage Vref can be applied to the first node N1 and the second node N2 respectively.

The second scan signal SCAN2 of a high level can be applied to the gate line GLb in the first period P1. The third scan signal SCAN3 applied to the gate line GLc in the first period P1 can be a low level.

The first scan signal SCAN1 of a low level can be applied to the gate line GLa in the second period P2, and the light-emitting element ED can be in a light-emitting state.

The second scan signal SCAN2 can maintain a high level in the first period P1 and a part of the second period P2. As the second scan signal SCAN2 of a high level is applied, the first control transistor COT1 can maintain a turn-on state.

As the third scan signal SCAN3 maintains a low level in the corresponding period, the second control transistor COT2 can maintain a turn-off state. The control voltage Vb can maintain the second level L2 in the corresponding period. Alternatively, it can be in a state that the control voltage Vb is not supplied in the corresponding period.

As the source electrode and the control gate electrode GEc of the driving transistor DRT are electrically connected in a period that a display driving is performed, a current output characteristic of the driving transistor DRT can be maintained stably.

The second scan signal SCAN2 of a low level can be applied to the gate line GLb in the control period CP of the frame period FP. The third scan signal SCAN3 of a high level can be applied to the gate line GLc in the control period CP.

The first control transistor COT1 can be turned-off by the second scan signal SCAN2 of a low level. The second node N2 and the third node N3 may not be electrically connected to each other in the control period CP.

The second control transistor COT2 can be turned-on by the third scan signal SCAN3 of a high level. The control voltage Vb of the first level L1 can be applied to the control gate electrode GEc of the driving transistor DRT in the control period CP. The threshold voltage of the driving transistor DRT can be changed, and the driving transistor DRT can be turned-off. The non-light-emitting driving of the light-emitting element ED can be performed in the control period CP.

As described above, the non-light-emitting driving by a turn-off of the driving transistor DRT can be performed easily while maintaining a current output characteristic of the driving transistor DRT stably by a structure that the first control transistor COT1 and the second control transistor COT2 are connected to the third node N3.

Furthermore, according to embodiments of the present disclosure, as the above-mentioned structure is implemented by using other types of the first control transistor COT1 and the second control transistor COT2, a structure being capable of performing the non-light-emitting driving can be provided while reducing the number of the gate line GL disposed on the subpixel SP.

Figure 8:
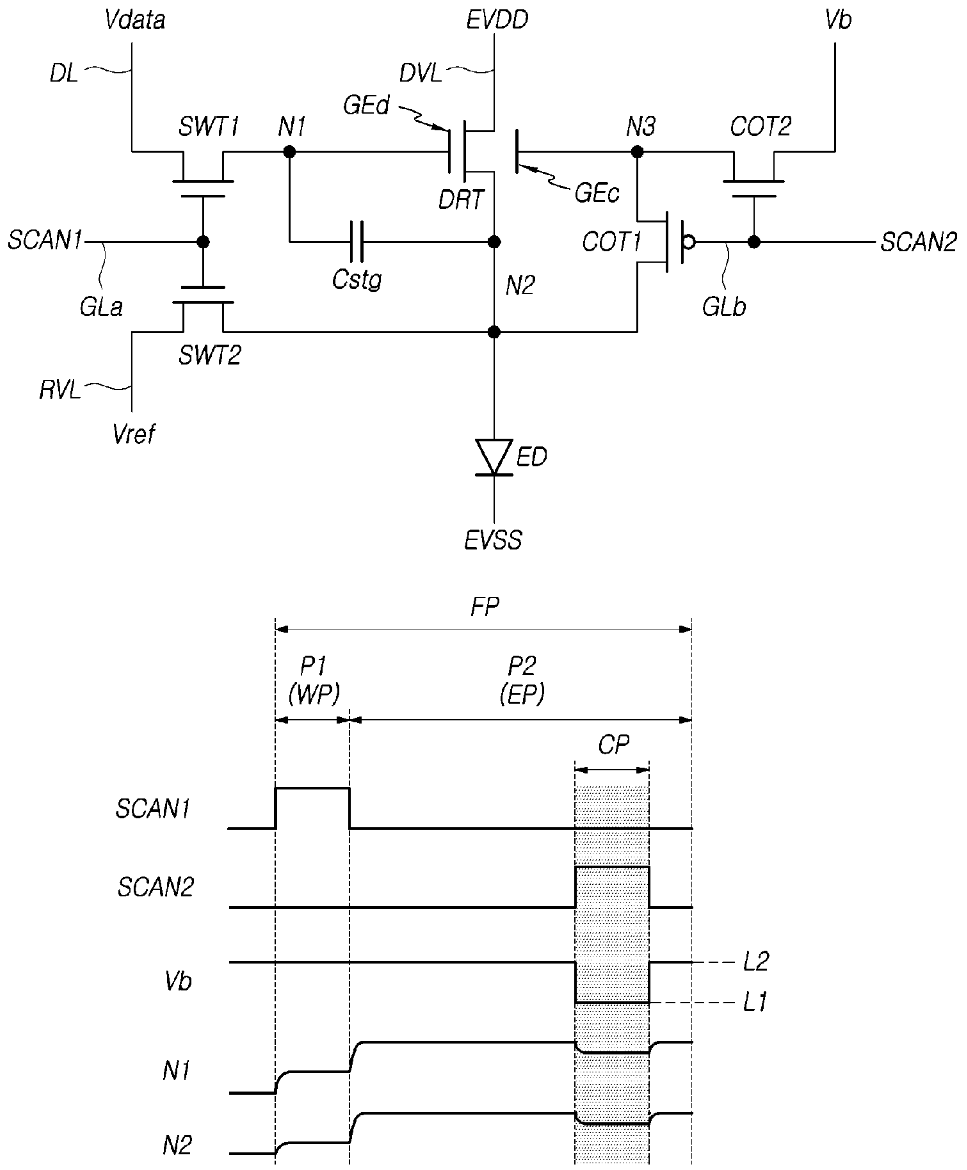
FIG. 8 is a diagram illustrating still another example of a circuit structure of a subpixel included in a display device and an example of a driving method thereof according to embodiments of the present disclosure.

FIG. 8 is a diagram illustrating still another example of a circuit structure of the subpixel SP included in the display device 100 and an example of a driving method thereof according to embodiments of the present disclosure.

Referring to FIG. 8, the subpixel SP can include the first control transistor COT1 electrically connected between the second node N2 and the third node N3. The subpixel SP can include the second control transistor COT2 electrically connected to the third node N3. The second control transistor COT2, in some cases, can be disposed outside of an area where the subpixel SP is disposed.

For example, such as an example illustrated in FIG. 8, the first control transistor COT1 can be a P type. The second control transistor COT2 can be an N type.

Alternatively, the first control transistor COT1 can be an N type, and the second control transistor COT2 can be a P type.

The first control transistor COT1 and the second control transistor COT2 can be controlled by a same gate line GLb. The first control transistor COT1 and the second control transistor COT2 can be controlled by the second scan signal SCAN2 applied to the gate line GLb.

As the first control transistor COT1 and the second control transistor COT2 are implemented as CMOS type, the first control transistor COT1 and the second control transistor COT2 can be controlled by one scan signal.

For example, the second scan signal SCAN2 of a low level can be applied to the gate line GLb in the data writing period WP and a part of the light-emitting period EP of the frame period FP.

The first control transistor COT1 can be turned-on and the second control transistor COT2 can be turned-off in a period that the second scan signal SCAN2 of a low level is applied. The second node N2 and the third node N3 can be electrically connected. The control voltage Vb may not be supplied to the control gate electrode GEc of the driving transistor DRT.

The second scan signal SCAN2 of a high level can be applied to the gate line GLb in the control period CP of the frame period FP.

The first control transistor COT1 can be turned-off and the second control transistor COT2 can be turned-on in a period that the second scan signal SCAN2 of a high level is applied. The second node N2 and the third node N3 may not be electrically connected to each other. The control voltage Vb of the first level L1 can be supplied to the control gate electrode GEc of the driving transistor DRT.

While maintaining a current output characteristic of the driving transistor DRT stably in a display driving, the non-light-emitting driving by the control voltage Vb can be performed. As the first control transistor COT1 and the second control transistor COT2 are driven by one gate line GLb, the number of signal lines disposed on the subpixel SP can be reduced.

Such as described above, embodiments of the present disclosure can easily perform the non-light-emitting driving of the subpixel SP by a control of the control voltage Vb applied to the control gate electrode GEc of the driving transistor DRT. The control voltage line CVL supplying the control voltage Vb can be disposed in the display panel 110 as various shapes. A performing method of the non-light-emitting driving can be various according to an arrangement structure of the control voltage line CVL.

Figure 9A:
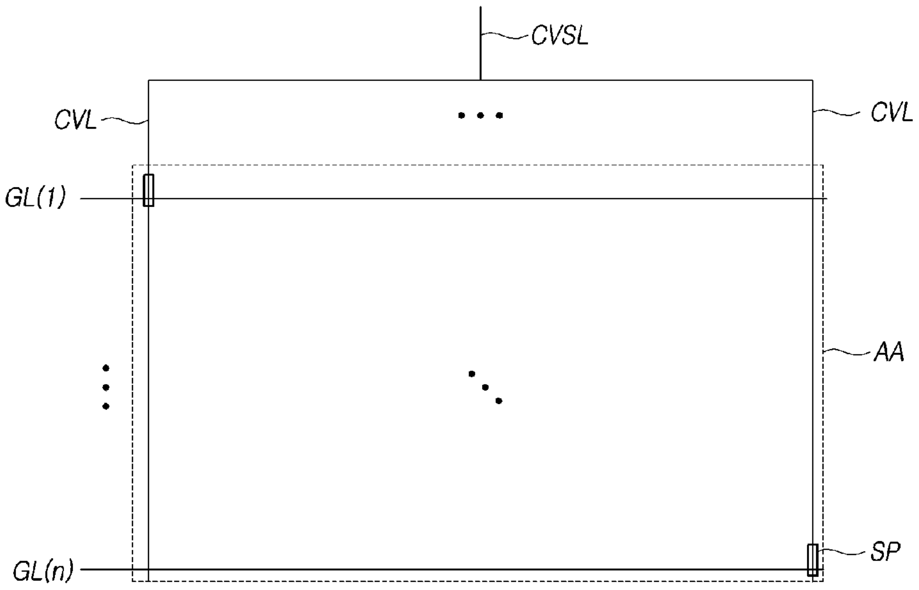
FIGS. 9A and 9B are diagrams illustrating an example of a structure that a control voltage line is disposed in a display device according to embodiments of the present disclosure.
Figure 9B:
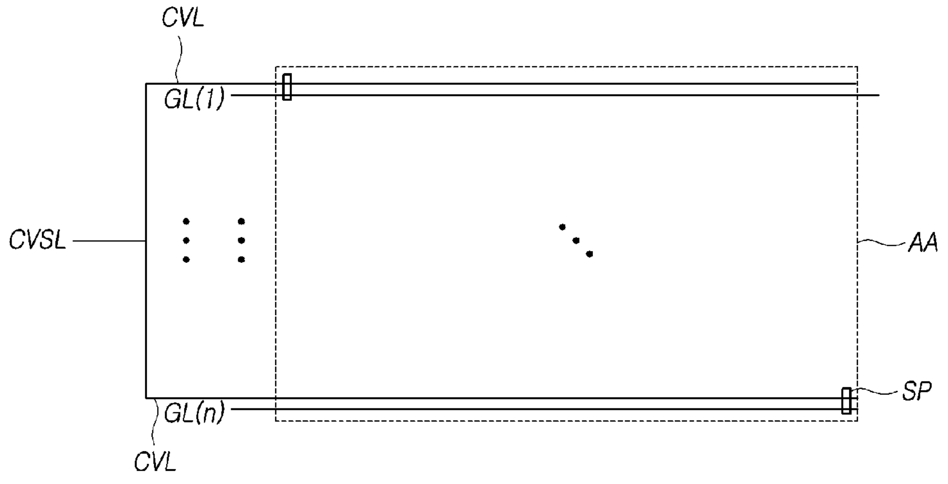

FIGS. 9A and 9B are diagrams illustrating an example of a structure that the control voltage line CVL is disposed in the display device 100 according to embodiments of the present disclosure.

Referring to FIGS. 9A and 9B, the control voltage line CVL can be disposed to be connected to two or more subpixels SP disposed on the active area AA.

The control voltage line CVL can be electrically connected to the control gate electrodes GEc of the driving transistors DRT disposed on each of two or more subpixels SP. The control gate electrodes GEc of the driving transistors DRT disposed on different subpixels SP can be electrically connected to each other by the control voltage line CVL.

The control voltage line CVL can be disposed in one direction. For example, such as an example illustrated in FIG. 9A, the control voltage line CVL can be disposed in a direction crossing a direction in which the gate line GL is disposed. The control voltage line CVL can be disposed in a direction in which the data line DL or the driving voltage line DVL is disposed and can be electrically connected to the subpixel SP. In this case, the data line DL, the driving voltage line DVL, the reference voltage line RVL and the control voltage line CVL can be disposed in same direction.

The control voltage line CVL can be electrically connected to a control voltage supply line CVSL supplying the control voltage Vb on outside of the active area AA.

In a structure that the control voltage line CVL is disposed such as an example illustrated in FIG. 9A, the control voltage Vb can be supplied to all subpixels SP disposed on the active area AA simultaneously. The non-light-emitting driving can be performed in all subpixels SP simultaneously in the frame period FP.

In another example, such as an example illustrated in FIG. 9B, the control voltage line CVL can be disposed in a direction in which the gate line GL is disposed.

The control voltage line CVL can be electrically connected to the control voltage supply line CVSL on outside of the active area AA.

In a structure illustrated in FIG. 9B, the control voltage Vb can be supplied to the plurality of control voltage lines CVL simultaneously and the non-light-emitting driving can be performed.

Alternatively, the control voltage Vb can be supplied to the plurality of control voltage lines CVL sequentially and the non-light-emitting driving can be performed. Furthermore, the non-light-emitting driving can be performed sequentially by a group unit including two or more control voltage lines CVL.

A sequential non-light-emitting driving by the control voltage line CVL can be performed by the gate driving circuit 120 or a circuit disposed separately. As the control voltage line CVL is disposed in a direction in which the gate line GL is disposed and the non-light-emitting driving is performed, even though the non-light-emitting driving is performed sequentially, the non-light-emitting driving can be performed without that an image quality abnormality is recognized.

Furthermore, according to embodiments of the present disclosure, as the non-light-emitting driving is performed through a control of the control voltage line CVL electrically connected to the control gate electrode GEc of the driving transistor DRT, the non-light-emitting driving can be performed without affecting a display driving timing by the gate line GL and the data line DL.

Figure 10:
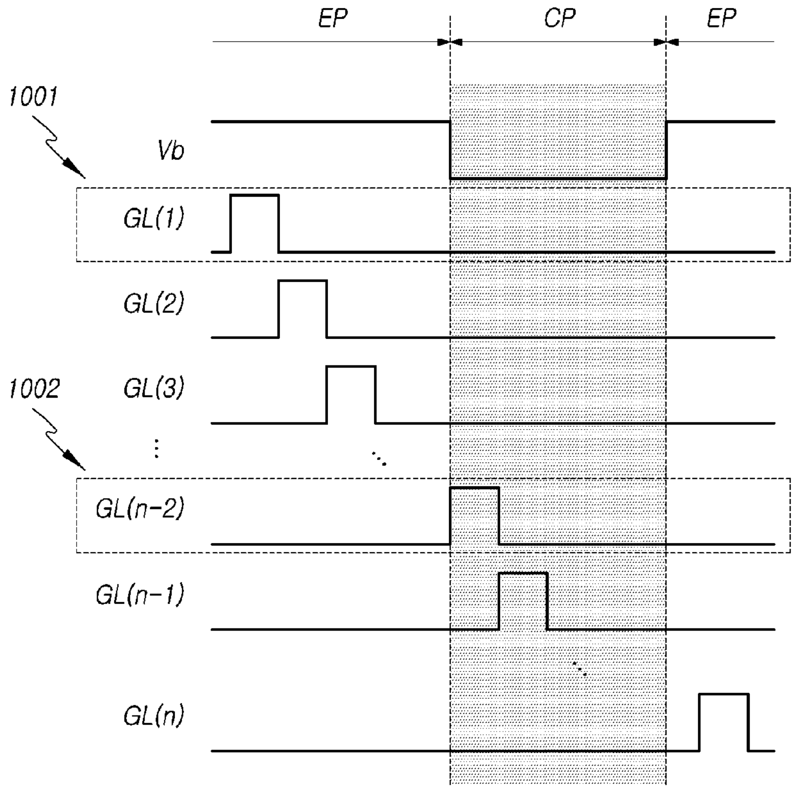
FIG. 10 is a diagram illustrating an example of a driving timing of a gate line and a control voltage line disposed in a display device according to embodiments of the present disclosure.

FIG. 10 is a diagram illustrating an example of a driving timing of the gate line GL and the control voltage line CVL disposed in the display device 100 according to embodiments of the present disclosure.

Figure 11A:
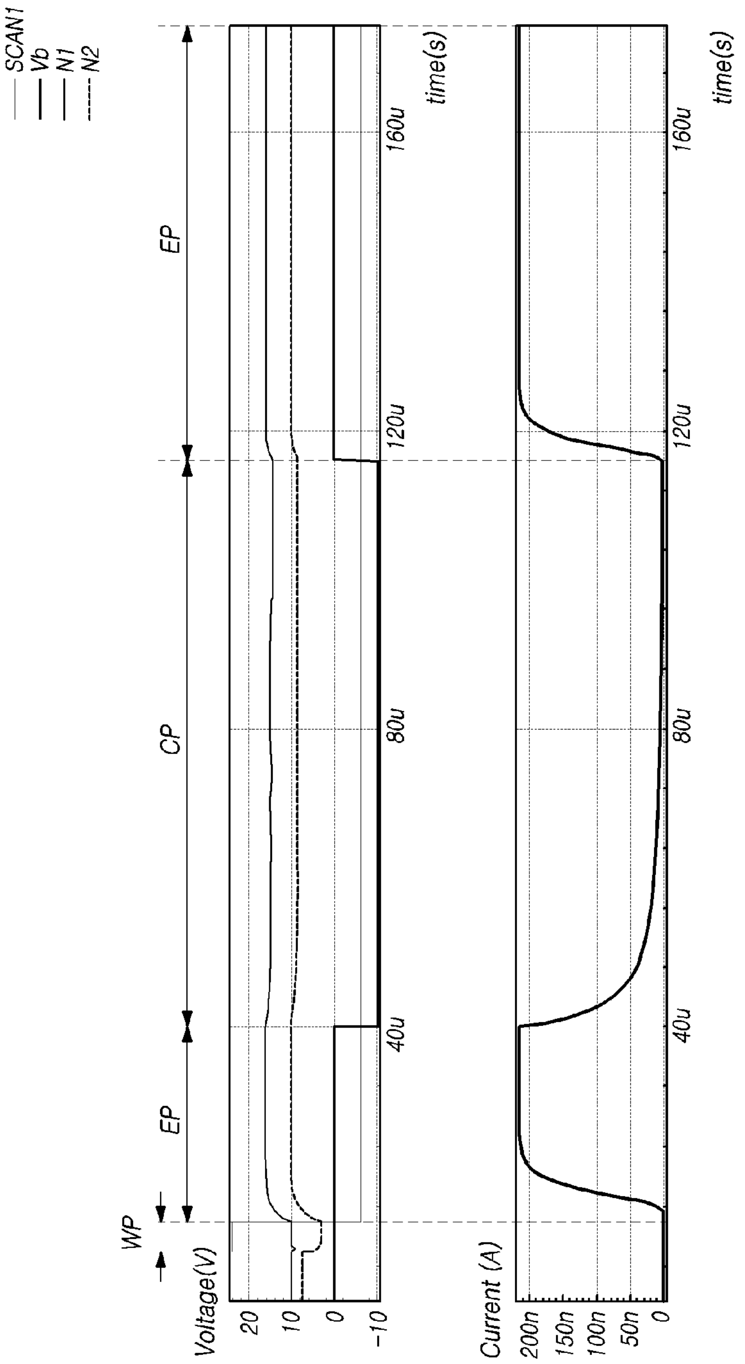
FIG. 11A is a diagram illustrating an example of a voltage waveform according to a driving of a subpixel driven by a gate line indicated by 1001 illustrated in FIG. 10 according to embodiments of the present disclosure.
Figure 11B:
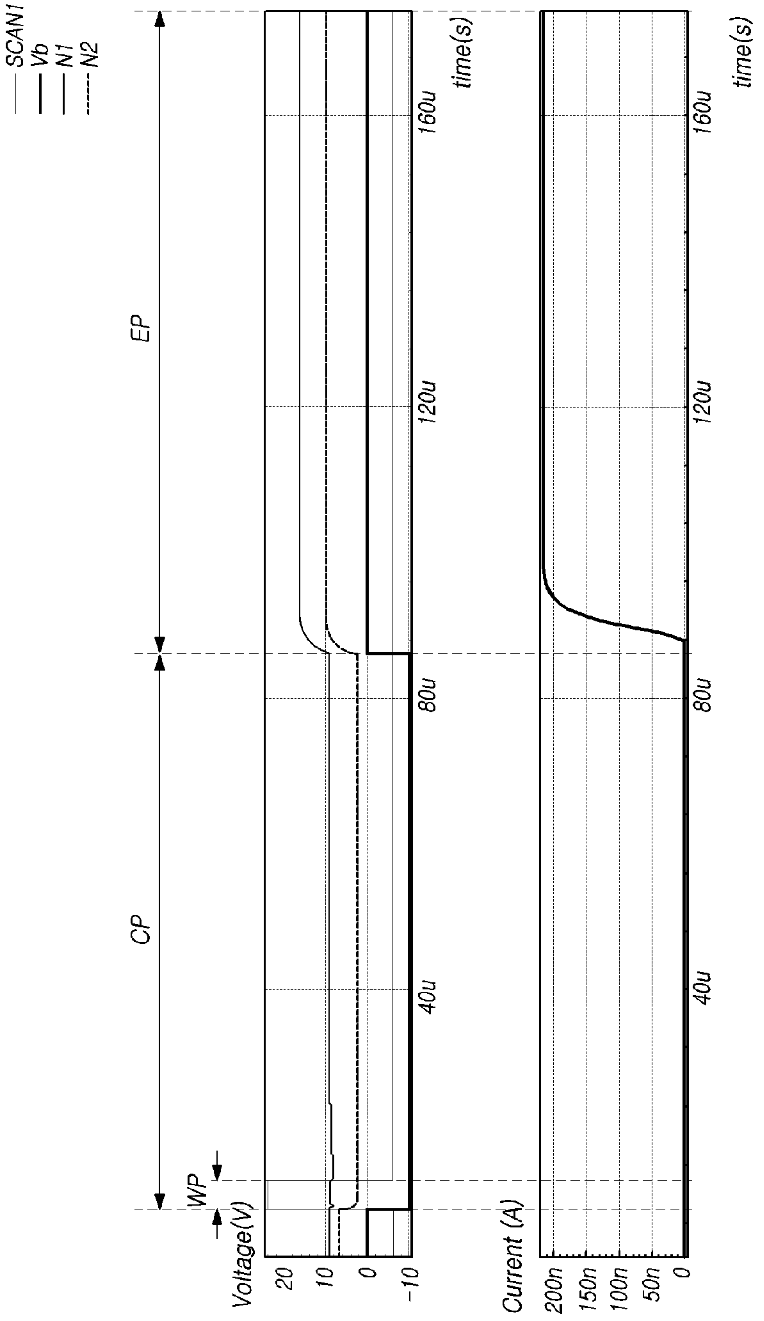
FIG. 11B is a diagram illustrating an example of a voltage waveform according to a driving of a subpixel driven by a gate line indicated by 1002 illustrated in FIG. 10 according to embodiments of the present disclosure.

FIG. 11A is a diagram illustrating an example of a voltage waveform according to a driving of the subpixel SP driven by the gate line GL indicated by 1001 illustrated in FIG. 10 according to one embodiment. FIG. 11B is a diagram illustrating an example of a voltage waveform according to a driving of the subpixel SP driven by the gate line GL indicated by 1002 illustrated in FIG. 10 according to one embodiment.

Referring to FIG. 10, the scan signal can be applied sequentially from the first gate line GL(1) to the nth gate line GL(n) and a display driving can be performed.

The control voltage Vb can maintain a certain level in the light-emitting period EP. A level of the control voltage Vb can be a level not to change the threshold voltage of the driving transistor DRT, or not to turn-off the driving transistor DRT. Alternatively, in some cases, the control voltage Vb may not be supplied in the light-emitting period EP.

The control voltage Vb can be changed to a level shifting the threshold voltage of the driving transistor DRT. An example illustrated in FIG. 10 illustrates an example that a level of the control voltage Vb decreases in the control period CP, but the level of the control voltage Vb can increase in the control period CP according to types of the driving transistor DRT.

The driving transistor DRT can be turned-off by a shift of the threshold voltage of the driving transistor DRT.

As the driving transistor DRT is turned-off, the light-emitting element ED driven by the driving transistor DRT in the control period CP can be in the non-light-emitting state. The non-light-emitting driving can be performed easily in the assumed light-emitting period by a control of the control voltage Vb, and a video response time according to a driving of the subpixel SP can be improved.

Furthermore, as the control voltage Vb for the non-light-emitting driving is applied to the control gate electrode GEc of the driving transistor DRT, it doesn't affect a voltage applied to the first node N1 and the second node N2 of the driving transistor DRT and thus a driving of the subpixel SP can be performed independently from the non-light-emitting driving.

Referring to FIG. 11A, it illustrates an example of a voltage waveform of the subpixel SP driven by the first gate line GL(1).

The first scan signal SCAN1 of a high level can be supplied to the subpixel SP in the data writing period WP. The data voltage Vdata is applied to the first node N1 and the reference voltage Vref can be applied to the second node N2.

When the first scan signal SCAN1 is changed to a low level, voltages of the first node N1 and the second node N2 can increase and the driving transistor DRT can output a driving current. After the data writing period WP, the light-emitting period EP that the light-emitting element ED emits a light can be subsequent.

The control voltage Vb of a low level can be applied in the control period CP. When the control voltage Vb is applied, voltage levels of the first node N1 and the second node N2 can be lowered a little. A difference between a voltage level of the first node N1 and a voltage level of the second node N2 can be maintained in the control period CP.

As the threshold voltage of the driving transistor DRT is shifted by the control voltage Vb in the control period CP, the driving transistor DRT and the light-emitting element ED can be turned-off and the non-light-emitting driving can be performed.

The control voltage Vb can be changed to a high level after the control period CP. When a level of the control voltage Vb is changed, voltage levels of the first node N1 and the second node N2 can increase a little.

The threshold voltage of the driving transistor DRT can be changed by a level change of the control voltage Vb, and the driving transistor DRT can be turned-on. As a voltage level difference between the first node N1 and the second node N2 is maintained, a driving current can be supplied to the light-emitting element ED by the driving transistor DRT and the light-emitting element ED can be turned-on.

A voltage application to the first node N1 and the second node N2 can be performed in the control period CP in which the control voltage Vb of a low level is applied.

Referring to FIG. 11B, it illustrates an example of a voltage waveform of the subpixel SP driven by the (n−2)th gate line GL(n−2).

At least a part of the data writing period WP can overlap with the control period CP. The first scan signal SCAN1 of a high level can be supplied to the subpixel SP in the data writing period WP. Simultaneously, the control voltage Vb of a low level can be supplied to the subpixel SP.

As the control voltage Vb is applied to the control gate electrode GEc of the driving transistor DRT, each of the data voltage Vdata and the reference voltage Vref can be applied to the first node N1 and the second node N2 respectively. A data writing can be performed to the subpixel SP in a period that the non-light-emitting driving is performed.

Voltages of the first node N1 and the second node N2 can be lowered a little at a timing that the control voltage Vb is changed to a low level. A difference between a voltage level of the first node N1 and a voltage level of the second node N2 can be maintained same or similar with a difference configured according to the data voltage Vdata and the reference voltage Vref supplied in the data writing period WP.

As the threshold voltage of the driving transistor DRT is shifted by the control voltage Vb of a low level, the driving transistor DRT may not be turned-on and the non-light-emitting driving can be performed.

After the control period CP, the control voltage Vb of a high level can be supplied to the subpixel SP.

Voltage levels of the first node N1 and the second node N2 can increase and the driving transistor DRT can be turned-on. The light-emitting element ED can be turned on according to a driving current supplied through the driving transistor DRT and can be driven.

Such as described above, as the non-light-emitting driving can be performed independently from a display driving, the display driving and the non-light-emitting driving can be performed without a reduction or a change of a display driving period according to the non-light-emitting driving.

Furthermore, a timing that the non-light-emitting driving is performed can be various according to an arrangement structure and a driving method of the control voltage line CVL.

Figure 12A:
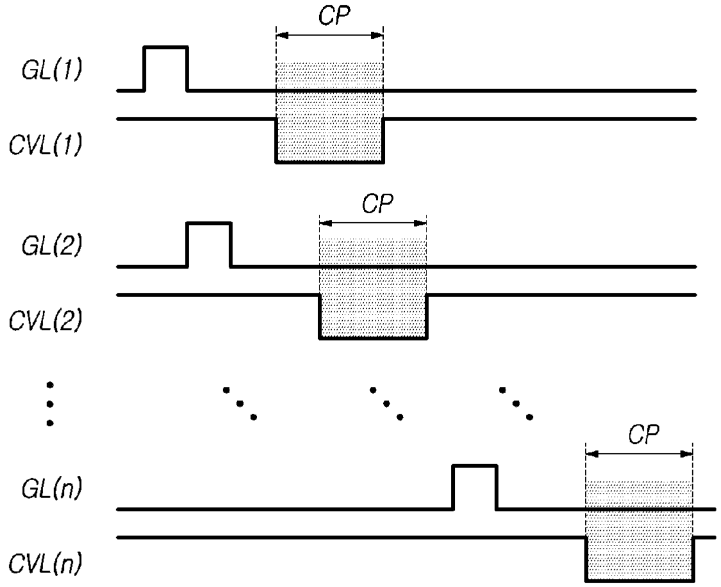
FIGS. 12A and 12B are diagrams illustrating other examples of a driving timing of a gate line and a control voltage line disposed in a display device according to embodiments of the present disclosure.
Figure 12B:
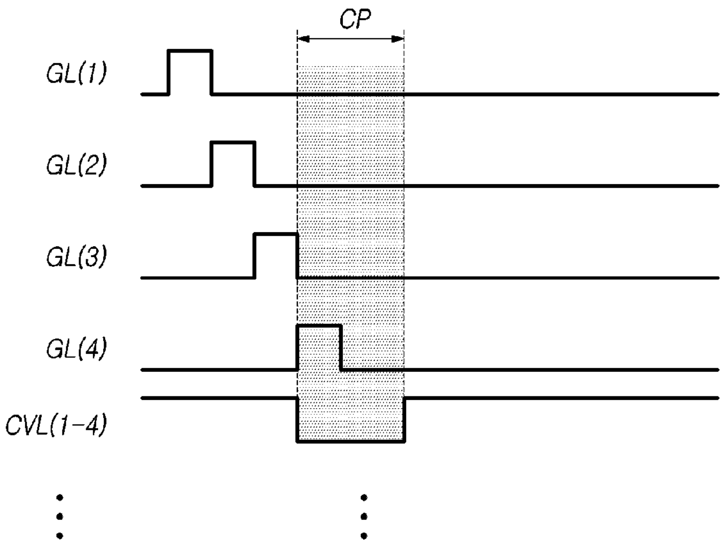

FIGS. 12A and 12B are diagrams illustrating other examples of a driving timing of the gate line GL and the control voltage line CVL disposed in the display device 100 according to embodiments of the present disclosure.

Referring to FIG. 12A, in the case that the control voltage line CVL is disposed in a direction in which the gate line GL is disposed, the non-light-emitting driving can be sequentially performed by the control voltage line CVL.

For example, the non-light-emitting driving by the first control voltage line CVL(1) can be performed in a control period CP in driving the subpixel SP by the first gate line GL(1). A level of a control voltage applied to the control gate electrode of at least one driving transistor of the plurality of driving transistors in a period that a scan signal is applied to a first gate line of the plurality of gate lines may be different from a level of the control voltage applied to the control gate electrode of the at least one driving transistor in a period that a scan signal is applied to a second gate line of the plurality of gate lines.

The control voltage line CVL can be disposed in a direction in which the gate line GL is disposed, and the display driving and the non-light-emitting driving can be performed sequentially.

Alternatively, even in the case that the control voltage line CVL is disposed in a direction in which the gate line GL is disposed, two or more control voltage lines CVL can drive simultaneously, that is, the control voltage Vb of the first level L1 may be simultaneously applied to the control gate electrode of each of at least two driving transistors of a plurality of driving transistors and the non-light-emitting driving can be performed.

For example, referring to FIG. 12B, the gate line GL can be sequentially driven from the first gate line GL(1) to the fourth gate line GL(4). The control voltage Vb of a low level can be supplied to the first control voltage line CVL(1) to the fourth control voltage line CVL(4) simultaneously at a timing that the scan signal is supplied to the fourth gate line GL(4).

As a period in which the control voltage Vb of a low level is applied can be independent from a period in which the scan signal is applied, the control voltage Vb of a low level can be applied in a period the scan signal is applied to any one of the first gate line GL(1) to the fourth gate line GL(4).

The non-light-emitting driving can be performed by a group unit driven by four control voltage line CVL.

Furthermore, other than above-mentioned methods, the control voltage Vb can be supplied in various periods independent from a period in which the scan signal is supplied, and simultaneous or sequential non-light-emitting driving can be performed.

The embodiments of the present disclosure described above will be briefly described as follows.

A display device 100 according to embodiments of the present disclosure can include a display panel 110 in which a plurality of gate lines GL, a plurality of data lines DL and a plurality of subpixels SP are disposed, a plurality of light-emitting elements ED disposed on each of the plurality of subpixels SP, and a plurality of driving transistors DRT configured to drive each of the plurality of light-emitting elements ED and including a driving gate electrode GEd and a control gate electrode GEc which is opposed to the driving gate electrode GEd and electrically connected to a control voltage line CVL.

In a control period CP which is a part of a frame period FP, a control voltage Vb of a first level L1 can be applied to the control gate electrode GEc of at least one driving transistor DRT of the plurality of driving transistors DRT, and the at least one driving transistor DRT can be turned-off in the control period CP.

In the control period CP, a scan signal can be applied to a gate line GL driving a subpixel SP on which the at least one driving transistor DRT is disposed.

In a period other than the control period CP of the frame period FP, a control voltage Vb of a second level L2 different from the first level L1 can be applied to the control gate electrode GEc of the at least one driving transistor DRT.

At least a part of a period in which the control voltage Vb of the second level L2 is applied can overlap a light-emitting period EP of the frame period FP.

The control voltage line CVL can be disposed in a direction that the plurality of data lines DL are disposed, and the control voltage Vb of the first level L1 can be simultaneously applied to the control gate electrode GEc of each of the plurality of driving transistors DRT.

Alternatively, the control voltage line CVL can be disposed in a direction that the plurality of gate lines GL are disposed, and the control voltage Vb of the first level L1 can be sequentially applied to the control gate electrode GEc of each of the plurality of driving transistors DRT.

Alternatively, the control voltage line CVL can be disposed in a direction that the plurality of gate lines GL are disposed, and the control voltage Vb of the first level L1 can be simultaneously applied to the control gate electrode GEc of each of at least two driving transistors DRT of the plurality of driving transistors DRT.

The control voltage line CVL can be electrically connected a control voltage supply line CVSL disposed outside of an area where the plurality of subpixels SP are disposed.

A first control gate electrode of a first driving transistor disposed on a first subpixel of the plurality of subpixels SP can be electrically connected to a second control gate electrode of a second driving transistor disposed on a second subpixel of the plurality of subpixels SP.

The display device 100 can further include a first control transistor COT1 configured to be electrically connected between the control gate electrode GEc and a source electrode of each of the plurality of driving transistors DRT, and a second control transistor COT2 configured to be electrically connected to a node between the control gate electrode GEc and the first control transistor COT1 and control a supply of the control voltage Vb to the control gate electrode GEc.

The first control transistor COT1 can be a turn-off state in a period that the second control transistor COT2 is a turn-on state.

The second control transistor COT2 can be a turn-off state in a period that the first control transistor COT1 is a turn-on state.

The first control transistor COT1 can be an N type and the second control transistor COT2 can be a P type. Alternatively, the first control transistor COT1 can be a P type and the second control transistor COT2 can be an N type.

The first control transistor COT1 and the second control transistor COT2 can be controlled by a same gate line GL.

The first control transistor COT1 can be disposed on each of the plurality of subpixels SP and the second control transistor COT2 can be disposed outside of an area where the plurality of subpixels SP are disposed.

A voltage level of the driving gate electrode GEd can be changed at a timing that the control voltage Vb of the first level L1 is applied.

A difference between a voltage level of the driving gate electrode GEd of the at least one driving transistor DRT and a voltage level of a source electrode of the at least one driving transistor DRT can be maintained during the control period CP.

A display device 100 according to embodiments of the present disclosure can include a display panel 110 in which a plurality of gate lines GL, a plurality of data lines DL and a plurality of subpixels SP are disposed, and a plurality of driving transistors DRT disposed on each of the plurality of subpixels SP and including a driving gate electrode GEd and a control gate electrode GEc which is opposed to the driving gate electrode GEd and electrically connected to a control voltage line CVL, and wherein a level of a control voltage Vb applied to the control gate electrode GEc of at least one driving transistor DRT of the plurality of driving transistors DRT in a period that a scan signal is applied to a first gate line of the plurality of gate lines GL is different from a level of the control voltage Vb applied to the control gate electrode GEc of the at least one driving transistor DRT in a period that a scan signal is applied to a second gate line of the plurality of gate lines GL.

According to embodiments of the present disclosure above-mentioned, a threshold voltage of the driving transistor DRT can be shifted by a control of the control voltage Vb applied to the control gate electrode GEc which is opposed to the driving gate electrode GEd of the driving transistor DRT.

Thus, a turn-on state, a turn-off state of the driving transistor DRT can be controlled easily, a not light-emitting driving can be performed in a display driving, and a video response time of the subpixel SP can be improved.

Furthermore, as the not light-emitting driving is performed by a control of the control voltage Vb applied to the control gate electrode GEc which is separated from a gate node or a source node of the driving transistor DRT, the not light-emitting driving can be performed independently from a period in which the scan signal is applied.

Thus, according to embodiments of the present disclosure, the display device 100 that the not light-emitting driving can be performed easily without affecting a display driving timing can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:

a display panel including a plurality of gate lines, a plurality of data lines, and a plurality of subpixels;

a plurality of light-emitting elements disposed on the plurality of subpixels; and a plurality of driving transistors configured to drive the plurality of light-emitting elements, each of the plurality of driving transistors comprising a driving gate electrode and a control gate electrode which is opposed to the driving gate electrode and electrically connected to a control voltage line, and wherein a frame period includes a data written period during which the plurality of light-emitting elements do not emit light, and a light-emitting period directly following the data written period and including first and second periods during which at least one of the plurality of light-emitting elements emit light and a control period between the first period and the second period, the first period, the control period, and the second period proceeding in this order, wherein after the frame period is switched from the data written period to the light-emitting period, in the control period of the light-emitting period a control voltage of a first level is applied to the control gate electrode of at least one driving transistor of the plurality of driving transistors, and the at least one driving transistor is turned-off in the control period.

2. The display device of claim 1, wherein, in the control period, a scan signal is applied to a gate line driving a subpixel from the plurality of subpixels on which the at least one driving transistor is disposed.

3. The display device of claim 1, wherein, in at least one of the first and second periods other than the control period within the light-emitting period, a control voltage of a second level that is different from the first level is applied to the control gate electrode of the at least one driving transistor.

4. The display device of claim 3, wherein at least a part of a period in which the control voltage of the second level is applied overlaps the light-emitting period.

5. The display device of claim 1, wherein the control voltage line is disposed in a direction that the plurality of data lines are disposed, and the control voltage of the first level is simultaneously applied to the control gate electrode of each of the plurality of driving transistors.

6. The display device of claim 1, wherein the control voltage line is disposed in a direction that the plurality of gate lines are disposed, and the control voltage of the first level is sequentially applied to the control gate electrode of each of the plurality of driving transistors.

7. The display device of claim 1, wherein the control voltage line is disposed in a direction that the plurality of gate lines are disposed, and the control voltage of the first level is simultaneously applied to the control gate electrode of each of at least two driving transistors of the plurality of driving transistors.

8. The display device of claim 1, wherein the control voltage line is electrically connected to a control voltage supply line that is disposed outside of an area where the plurality of subpixels are disposed.

9. The display device of claim 1, wherein a first control gate electrode of a first driving transistor from the plurality of driving transistors that is disposed on a first subpixel of the plurality of subpixels is electrically connected to a second control gate electrode of a second driving transistor from the plurality of driving transistors that is disposed on a second subpixel of the plurality of subpixels.

10. The display device of claim 1, further comprising:

a first control transistor configured to be electrically connected between the control gate electrode and a source electrode of each of the plurality of driving transistors; and a second control transistor configured to be electrically connected to a node between the control gate electrode and the first control transistor, and control a supply of the control voltage to the control gate electrode.

11. The display device of claim 10, wherein the first control transistor is in a turn-off state in a period that the second control transistor is in a turn-on state.

12. The display device of claim 10, wherein the second control transistor is in a turn-off state in a period that the first control transistor is in a turn-on state.

13. The display device of claim 10, wherein the first control transistor is an N type transistor and the second control transistor is a P type transistor, or the first control transistor is the P type transistor and the second control transistor is the N type transistor.

14. The display device of claim 13, wherein the first control transistor and the second control transistor are controlled by a same gate line.

15. The display device of claim 10, wherein the first control transistor is disposed on each of the plurality of subpixels, and the second control transistor is disposed outside of an area where the plurality of subpixels are disposed.

16. The display device of claim 1, wherein a voltage level of the driving gate electrode is changed at a timing that the control voltage of the first level is applied.

17. The display device of claim 1, wherein a difference between a voltage level of the driving gate electrode of the at least one driving one driving transistor and a voltage level of a source electrode of the at least transistor is maintained during the control period.

18. The display device of claim 1, wherein a light-emitting element from the plurality of light-emitting elements is in a non-light-emitting state in the control period.

19. The display device of claim 1, wherein in the first period, a control voltage of a second level that is different from the first level is applied to the control gate electrode of the at least one driving transistor; and in the second period the control voltage of the second level is applied to the control gate electrode of the at least one driving transistor.

20. A display device comprising:

a display panel including a plurality of gate lines, a plurality of data lines, and a plurality of subpixels;

a plurality of light-emitting elements disposed on the plurality of subpixels; and a plurality of driving transistors configured to drive the plurality of light-emitting elements, each of the plurality of driving transistors comprising a driving gate electrode and a control gate electrode which is opposed to the driving gate electrode and electrically connected to a control voltage line, and a plurality of first switching transistors connected to the plurality of driving transistors, each of the plurality of first switching transistors including a gate electrode connected to a gate line from the plurality of gate lines, a first electrode connected to a data line from the plurality of data lines, and a second electrode connected to the driving gate electrode of a driving transistor from the plurality of driving transistors, wherein in a writing period of a subpixel from the plurality of subpixels, a first switching transistor from the plurality of first switching transistors that is included in the subpixel applies a data voltage from the data line that is connected to the first electrode of the first switching transistor to the driving gate electrode of a driving transistor from the plurality of driving transistors that is included in the subpixel while the driving transistor is off responsive to a gate signal from the gate line that is connected to the gate electrode of the first switching transistor having a first level that turns on the first switching transistor, wherein, in a light emission period of a light-emitting period of the subpixel that is after the writing period of the subpixel, the first switching transistor is turned off responsive to the gate signal having a second level that turns off the first switching transistor and the driving transistor is turned-on and a light-emitting element from the plurality of light-emitting elements that is included in the subpixel emits light responsive to the driving transistor turning on, wherein, in a control period within the light-emitting period that is after the light emission period during which the first switching transistor is off and the driving transistor is on, a control voltage of a first level is applied to the control gate electrode of the driving transistor, and the driving transistor is turned-off in the control period responsive to the control voltage of the first level.

* * * * *